United States Patent [19]

Dunk

[11] 4,375,129
[45] Mar. 1, 1983

[54] INDICATING PLATFORM FOR MACHINE TOOLS

[76] Inventor: Thomas H. Dunk, 3400 Pleasant Valley Rd., Brighton, Mich. 48116

[21] Appl. No.: 153,165

[22] Filed: May 27, 1980

[51] Int. Cl.³ .............................................. B27G 23/00
[52] U.S. Cl. .................................. 33/185 R; 33/172 R
[58] Field of Search ............. 33/185 R, 172 R, 174 H, 33/168 R; 108/104; 126/30; 248/146, 129

[56] References Cited

U.S. PATENT DOCUMENTS

| | | | |
|---|---|---|---|
| 326,925 | 9/1885 | Sundin | 33/174 H |
| 1,779,867 | 10/1930 | Ahrold | 248/146 |
| 2,642,744 | 6/1953 | Thomas | 126/30 X |
| 3,212,193 | 10/1965 | Raccio | 33/174 H X |

FOREIGN PATENT DOCUMENTS

636699  5/1950  United Kingdom ............. 33/174 H

*Primary Examiner*—William D. Martin, Jr.
*Attorney, Agent, or Firm*—Basile, Weintraub & Hanlon

[57] ABSTRACT

A tooling aid for a machine tool includes an indicating platform adapted for use with a dial indicator for indicating whether the head of the machine tool is square to the work table. The indicating platform includes a top member which defines a flat, smooth surface. Support members connected to the top member space the top member parallel to the surface of the work table. The arm of the dial indicator rides on the top member as the head of the machine tool is rotated about the work table to provide a measure of the degree of squareness of the head with respect to the work table.

4 Claims, 2 Drawing Figures

INDICATING PLATFORM FOR MACHINE TOOLS

BACKGROUND OF THE INVENTION

1. Field of the Invention

This invention relates, in general, to machine tools and, more specifically, to tooling aids for machine tools for indicating the degree of squareness of the head of the tool with respect to the work table.

2. Description of the Prior Art

A variety of machine tools are utilized to perform various machining operations on a work piece or part. These machines, such as drill presses or milling machines, typically include a head and a spindle which holds and rotates a tool bit. The spindle may be raised and lowered to engage the tool bit with the work piece in performing a particular machining operation. The work piece is, in turn, releasably secured to a work surface or table by a fastening device, such as a vise or a chuck.

In order to insure a precision machining operation with accurate dimensions, it is necessary that the tool and thereby the head be properly aligned with the work table, i.e., that is, square or perpendicular thereto. This is especially critical in the initial set-up of a work piece or where the head is returned to a perpendicular position with respect to the work table after machining a prescribed angle.

Various types of indicating devices are known in the machining industry to measure the degree of squareness between the head of a machine tool and the work table. The most popular of these is the dial indicator which comprises a gauge that is attached to the spindle of the machine tool. A deflectable arm depends from the gauge to engage the surface of the work table. If the head is not square or perpendicular to the work table, the arm will deflect as the head is rotated about the work table, which deflection will be indicated by a deflection of a movable needle in the gauge to show the degree or amount that the head is out of square with respect to the work table.

Although dial indicators operate effectively to show the amount of deflection of the arm, the application of such dial indicators on vertical drill presses and milling machines poses several practical problems. For one, the work tables of small sized drill presses or verticle milling machine are approximately 9×12 inches, which, due to the relatively small size, limits the accurate measurement of the degree of squareness of the head since it is generally known that the larger the area measured, the more accurate the measurement will be. For another, conventional work tables are formed with parallel grooves for use with the various chucks and vises utilized to secure the work piece in position on the table. Such grooves interfere with the indicating arm as it is rotated about the work table and thereby reduce the reliability of the indicating measurement. In addition, crevices or holes are commonly formed in the surface of the work table over the period of time which further contributes to misleading measurements.

Thus, it would be desirable to provide a tooling aid for a machine tool which enables more accurate measurements of the degree of squareness between the head of the machine tool and the work table than previously possible utilizing prior art devices. It would also be desirable to provide a tooling aid suitable for providing an indication of the degree of squareness of the head of a machine tool with respect to the table which is easily applicable to conventional machine tools. Finally, it would be desirable to provide a tooling aid which increases the accuracy of standard dial indicators commonly used to measure the degree of squareness between the head of the machine tool and the surface of the work table.

SUMMARY OF THE INVENTION

There is disclosed herein a novel tooling aid for a machine tool which is utilized to provide an indication of the degree of squareness of the head of the machine tool with respect to the work table. The tooling aid comprises an indicating platform having a top member which defines a flat, smooth surface. Support members connected to the top member space the top member parallel to the surface of the work table.

The arm of a conventional dial indicator attached to the spindle of the machine tool rides on the surface of the top member, as the head and spindle are rotated about the work piece, to provide a measurement of the degree of squareness of the head with respect to the work table.

Alternately, the top member may include a central aperture such that the indicating platform may be disposed over vises or chucks on the work table without the need for removing the vises or chucks from the work table.

The indicating platform of this invention enables accurate measurements of the degree of squareness of the head of a machine tool with respect to the work table to be more easily, quickly and accurately made than previously possible utilizing prior art indicating devices. The flat, smooth surface of the top member of the indicating platform provides a surface which is parallel to the surface of the work table and which is engageable by the arm of a standard dial indicator attached to the head of the machine tool. Thus, the dial indicator can provide a more accurate measurement of the degree of squareness of the head with respect to the work table since the platform provides a surface which is free of the crevices, holes or grooves commonly found in the top surface of a standard work table. In addition, the diameter of the top member of the indicating platform of this invention is substantially larger than the diameters of the work tables on a smaller sized drilling or milling machines which further increases the accuracy of the measurement since a larger surface area is being measured by the dial indicator.

Further, the novel indicating platform of this invention is easily adaptable to a wide variety of standard machine tools, such as vertical drill presses or verticle milling machines. In addition, a central aperture may be formed in the top member to enable the indicating platform to be placed over the vises and chucks commonly disposed on the work table without the need for removing the vises or chucks from the work table. This further speeds up the measuring process.

BRIEF DESCRIPTION OF THE DRAWING

The various features, advantages and other uses of this invention will become more apparent by referring to the following detailed description and drawing in which.

DESCRIPTION OF THE PREFERRED EMBODIMENTS

Figure 1:
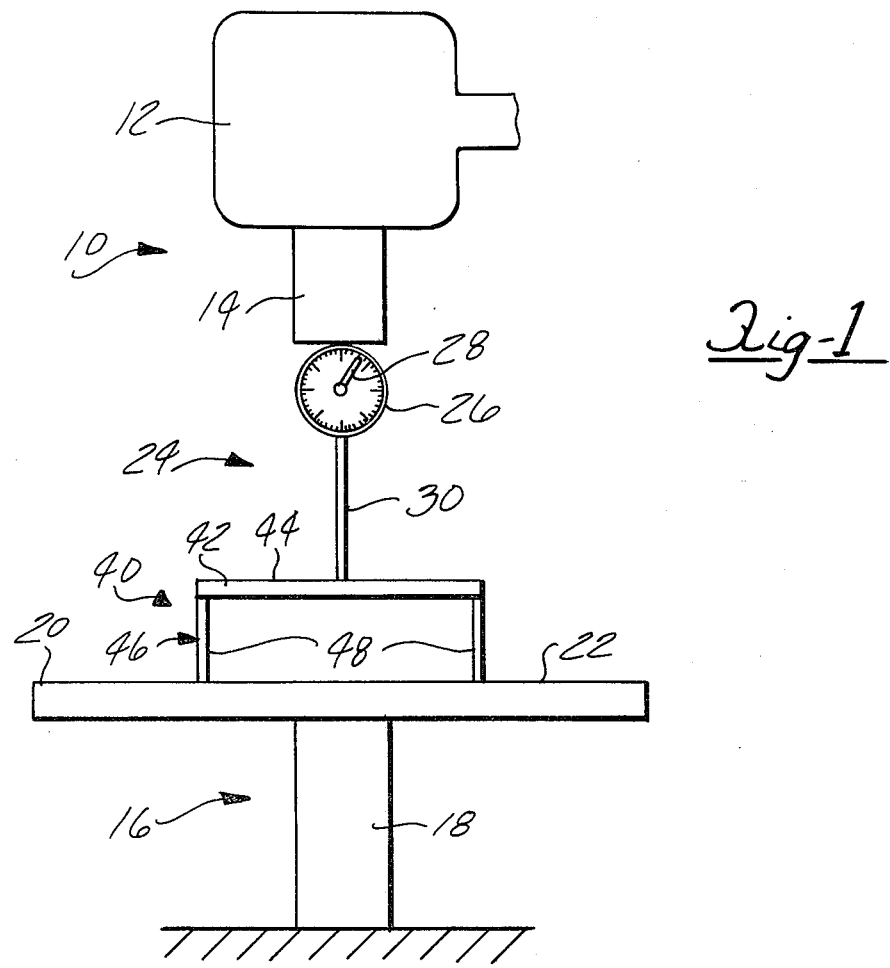
FIG. 1 is a pictorial, front elevational view of a standard machine tool utilizing a conventional dial indicator and incorporating an indicating platform constructed according to the teachings of this invention.

Throughout the following description and drawing, identical reference numbers are utilized to refer to the same component shown in multiple figures of the drawing.

Referring now to the drawing, and to FIG. 1 in particular, there is shown a conventional machine tool 10, such as a vertical drilling press or a vertical milling machine. For purposes of clarity, portions of the frame and the equipment utilized to control the operation of the machine tool 10 have been deleted. The machine tool 10 includes a head portion 12 wherein there is mounted a rotatable spindle 14. The spindle 14 removably holds a tool, such as a drill bit or mill, not shown, as is well-known to the skilled artisan. The spindle 14 is rotatable within the head portion 12 and may be raised or lowered so as to engage the tool bit with a work piece, also not shown.

The machine tool 10 further includes a conventional work table 16. The work table 16 comprises an upright stand 18 which mounts a table 20 to the floor. The table 20 may be movable in a horizontal or vertical direction if desired, depending upon the particular machining operation and machine tool utilized. The table 20 defines an upper work surface 22 whereon there is mounted a conventional vise or chuck, not shown, which releasably holds a work piece on the work table 20.

In performing accurate machining operations that are within the prescribed dimensional tolerances, it is necessary to insure that the head 12 and the spindle 14 mounted therein are perpendicular or square to the surface 22 of the work table 20. A conventional means of indicating such squareness is a dial indicator 24. The dial indicator 24 comprises a gauge 26 which is securely mounted to the spindle 14 of the machine roll 10. The gauge 26 includes a movable needle or arm 28 which deflects in response to movement of a depending arm 30 which depends outward from the gauge 26 of the dial indicator 24. The gauge 26 may be divided into suitable increments, such as thousands of an inch, to thereby provide an indication of the degree or amount that the head 12 and spindle 14 of the machine tool 10 are out of square or perpendicular with respect to the surface 22 of the work table 20.

Since dial indicators are well-known to the skilled artisan and since such dial indicators do not form a part of this invention, further details with respect to the detailed construction of the dial indicator and various features therein will not be included in this description.

In a measuring operation, the spindle 14 is rotated about the work table 20 in a circular motion. The arm 30 of the dial indicator 24 engages the top surface 22 of the work table 20 during such circular motion. The arm 30 will deflect thereby causing a corresponding movement of the needle 28 in the gauge 26 of the dial indicator 24 if the spindle 14 is not square or perpendicular with respect to the top surface 22 of the work table 20. The gauge 26 thereby provides an indication of the degree of squareness of the spindle 14 of the machine tool 10 with respect to the work table 20.

Figure 2:
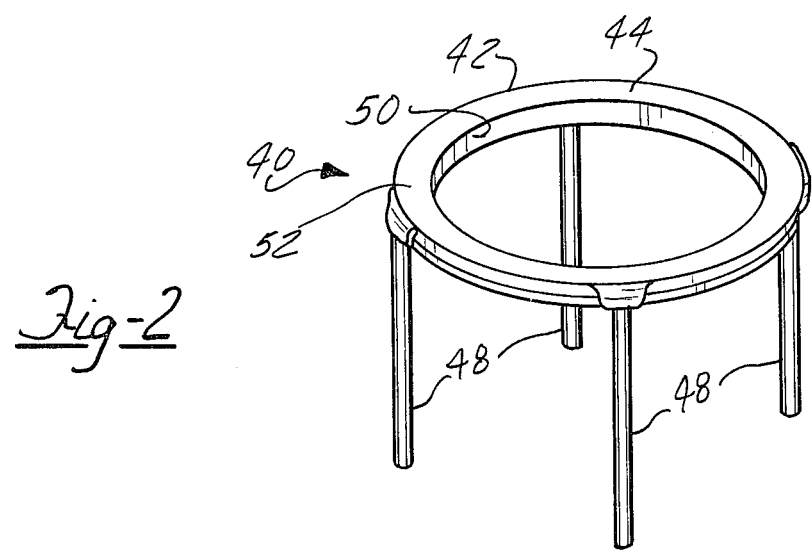
FIG. 2 is a perspective view of the indicating platform of this invention.

Referring now to FIG. 1, and more particularly to FIG. 2, there is shown a tooling aid such as an indicating platform 40, constructed according to the teachings of this invention which simplifies the measuring or indicating operation. The indicating platform 40, as shown in FIG. 2, comprises a first or top member 42 which is formed of any suitable material that has excellent dimensional stability, such as aluminum, steel, etc. The top surface 44 of the top member 42 is machined to form a substantially flat, smooth surface. In addition, the top member 42 of the indicating platform 40 is preferrably formed in a substantially circular-shaped disc configuration. Furthermore, it has been found that a circular disc having a diameter of approximately 13 inches provides excellent advantages when the indicating platform 40 is utilized on smaller sized vertical milling machines or drilling presses. However, other dimensions and shapes, such as square or rectangular, utilized to form the top member 42 of the indicating platform 40 are also within the scope of this invention.

The indicating platform 40 further includes support means 46. The support means 46 spaces the top member 42 at a predetermined distance from the top surface 22 of the work table 20 and, also, disposes the top surface 42 parallel to the top surface 22 of the work table 20. In the preferred embodiment, the support means 46 comprises a plurality of vertically-extending legs 48. The legs 48 are machined and hardened to form a matched set that disposes the top surface 44 of the top member 42 substantially parallel to the top surface 22 of the work table 20. The legs 48 are preferably connected to the bottom side or surface of the top member 42, although other conventional fastening modes and apparatus may also be employed to secure the legs 48 to the top member 42.

In use, the indicating platform 40 is placed on the top surface 22 of the work table 20 of a machine tool 10. The spindle 14 is lowered until the depending arm 30 of the dial indicator 24 engages the top surface 44 of the indicating platform 40. The spindle 14 and head 12 of the machine tool 10 are then rotated in a circle about the work table 20 such that the depending arm 30 of the dial indicator 24 correspondingly moves in a circular path about the top surface 44 of the indicating platform 40. If the spindle 14 of the machine tool is not square or perpendicular to the work table 20, the depending arm 30 of the dial indicator 24 will deflect thereby moving the needle 28 in the gauge 26 and providing an indication of the degree of squareness of the spindle 14 with respect to the work table 20.

In an alternate embodiment, the top member 42 of the indicating platform 40 may include a centrally disposed aperture 50, as shown in FIG. 2. In this embodiment, an outer ring 52 is formed in the top member 42 which defines a path for movement of the depending arm 30 of the dial indicator 24, in a manner similiar to that described above. This embodiment of the invention enables the indicating platform 40 to be installed directly over a vise and chuck mounted on the work table 20 of the machining tool 10 without requiring the removal of such vise or chuck therefrom.

In summary, there has been disclosed herein a tooling aid for a machining tool which comprises an indicating platform adapted for use with standard dial indicators to provide an indication of the degree of squareness of the head of the machine tool with respect to the work table. The indicating platform comprises a top member which defines a flat, smooth surface. Support means connected to the top member space the top member parallel to the surface of the work table such that the dial indicator, when engaging the top surface of the indicating platform, provides an indication of the degree of squareness of the head of the machine tool with respect to the work table.

The indicating platform of this invention enables more accurate measurements to be realized utilizing conventional indicating apparatus, such as dial indicators. In addition, the substantially larger surface area of the top member of the indicating platform than that conventionally found in the work tables of small sized drill and milling machines provides increased accuracy since a larger surface area is being measured by the dial indicator. In addition, by providing a central aperture in the top member of the indicating platform, the indicating platform may be disposed directly over the vises and chucks conventionally mounted on the top surface of the work table without requiring the same to be removed therefrom; which further simplifies the indicating operation.

What is claimed is:

1. In a machine tool having a work table, a spindle attached to a head portion and a dial indicator attached to the spindle for measuring the degree of perpendicularity of the head portion with respect to the work table, the improvement comprising:

an indicating platform including a first member having a planar top surface and means, attached to said first member, for supporting said first member a predetermined distance above and substantially parallel to the surface of said work table: said first member including a centrally-disposed aperture such that said top surface of said first member is disposed around objects mounted on the work table, said aperture defining an outer annular surface in said first member engageable by said dial indicator means.

2. The indicating platform of claim 1 wherein the first member defines a substantially circular-shaped disc.

3. The indicating platform of claim 1 wherein the disc is approximately 13 inches in diameter.

4. The indicating platform of claim 1 wherein the support means comprises a plurality of spaced legs connected to the first member.

* * * * *